United States Patent Office 3,141,910
Patented July 21, 1964

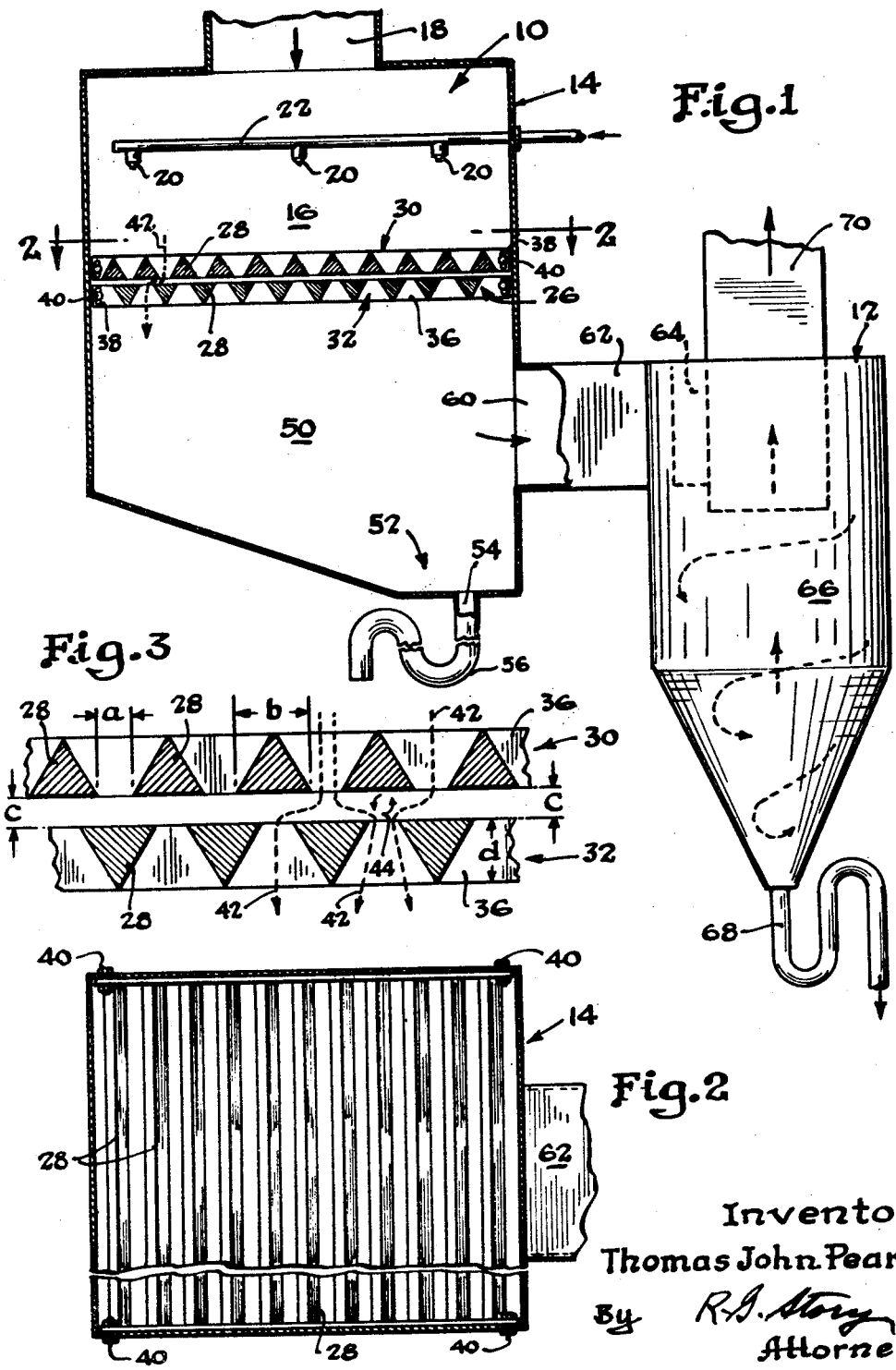

3,141,910
SCRUBBER FOR DUST AND GAS
Thomas John Pearce, Bartow, Fla., assignor to Swift & Company, Chicago, Ill., a corporation of Illinois
Filed Mar. 28, 1961, Ser. No. 98,836
4 Claims. (Cl. 261—108)

The present invention relates to gas scrubbing apparatus, and more specifically, to apparatus for contacting a dust laden gas with a liquid to remove the dust therefrom.

In the scrubbing of a gas with a liquid, an apparatus is ordinarily used which basically consists of a gas-liquid contacting chamber equipped with means to admit and remove a contaminated gas and a scrubbing liquid under pressure. To promote an efficient scrubbing action within the chamber, the scrubbing liquid is usually atomized and/or spread in a relatively thin film within the contacting chamber to increase the total contact area of the liquid.

Many configurations of apparatus which increase the effective contacting area of a given amount of scrubbing liquid have been suggested in the prior art. These prior art apparatus often include specially designed atomizing systems and various types of gas-liquid impingement gridworks which are placed within the contacting chamber of a scrubbing apparatus for purpose of promoting mixing between a dust laden gas and a scrubbing liquid by (1) causing a considerable degree of turbulence or mixing action in the gas-liquid stream, and (2) spreading the scrubbing liquid in a thin film and thereby increasing its effective surface area.

The prior art impingement gridworks, while promoting a fair degree of gas-liquid mixing, i.e. scrubbing, have been found to present certan difficulties in their use. First of all, it is often found that the impingement gridworks heretofore used in scrubbing apparatus cause what may be termed as an uncontrolled turbulence within a scrubber apparatus. This uncontrolled turbulence results in a relatively large pressure drop through the apparatus, which in turn represents a substantial energy loss and decrease in efficiency. A second major difficulty encountered in the use of many prior art impingement grids is that their design renders them difficult to maintain in a clean and drained condition.

It is therefore an object of the present invention to provide an improved gas scrubbing apparatus.

It is another object of the present invention to provide a highly efficient gas scrubbing apparatus having an improved impingement gridwork positioned in the contacting chamber thereof.

It is still a further object of the present invention to provide a gas scrubbing device having an impingement gridwork which effectively promotes contact between suspended solids in a gas and a scrubbing liquid with a minimum of turbulence and energy loss.

It is yet a further object of the present invention to provide an improved impingement grid assembly for a gas scrubbing apparatus which is self-cleaning in operation and provides suitable drainage in any position.

These and still further objects of the present invention will become readily apparent to those skilled in the art from the following detailed description of the invention.

In general, the present invention contemplates a gas scrubbing apparatus which includes a conventional scrubber housing that encloses a gas-liquid contacting chamber provided with means to admit and remove both the gas which is scrubbed and the scrubbing liquid utilized. Positioned within the gas-liquid contacting chamber is a single impingement plate assembly or gridwork of novel and particularly effective design. This impingement gridwork is positioned generally perpendicular to a stream of incoming contaminated gas and scrubbing liquid. The impingement grid assembly consists of two sets of parallel bars of triangular cross section superimposed over each other. A first set of triangular shaped bars is positioned to face the oncoming gas stream with the apexes thereof pointed into the stream and the bases thereof generally perpendicular to the direction of the stream. A second set of parallel spaced bars is positioned with their bases facing the gas stream and positioned directly in line with the openings presented by the first set of bars. This positioning of the two sets of bars has been found to effect a maximum degree of scrubbing action with a minimum amount of pressure drop. The two sets of parallel bars may be fastened together with a fixed intermediate space between them or may be adjustably fastened to the contacting chamber in such a manner that the intermediate space may be varied.

FIGURE 1 is a longitudinal sectional view through a gas scrubbing system embodying the present invention.

FIGURE 2 is a top elevation of the scrubbing portion of the apparatus of FIGURE 1 through section 2—2.

FIGURE 3 is a detailed illustration of the cross sections of the triangular bars used in the impingement gridwork of the present invention.

Referring to FIGURE 1, there is seen in cross section, a gas scrubbing system which comprises a gas-liquid contacting portion generally 10 and a gas-liquid separating portion generally 12. The gas-liquid contacting portion 10 comprises a scrubber body 14 which encloses a gas-liquid contacting chamber 16 that occupies the upper interior portion of scrubber body 14. Entering the top of the scrubber body 14 is a gas conduit 18 which serves to conduct an unscrubbed gas into the chamber 16. Located directly below the gas conduit 18 are spray nozzles 20 mounted on a manifold 22 which is connected with a high pressure source of scrubbing liquid. Located below the nozzles 20 is an impingement plate assembly generally 26, which forms the bottom of the gas-liquid contacting chamber 16.

The impingement plate assembly 26 comprises two rows of parallel positioned bars 28. Each of bars 28 has a generally triangular shaped cross section. These bars are arranged in an upper row 30 and a lower row 32, and are held in a position generally perpendicular to the walls of chamber 16 by means of four mounting members 36 which are affixed to the extremities of the bars 28 by means of welding or other suitable fastening means. As seen in FIGURE 1, the ends of mounting members 36 are provided with elongated holes 38 through which bolts 40 are passed to adjustably affix the plate assembly 26 to the walls of scrubber body 14. It is seen the elongated holes 38 in the mounting member 36 permit the two rows of parallel spaced bars 30 and 32 to be moved closer and further apart with respect to each other. It is clearly shown in FIGURE 2, that the triangular shaped bars 28 run parallel to each other and extend across the entire cross section of liquid gas contacting chamber 16.

It is shown in FIGURES 1 and 3 that the two rows of triangular shaped bars 30 and 32 are staggered with respect to each other in addition to being spaced slightly apart so that there is no direct line available through the plate assembly 26. Arrows 42 in FIGURES 1 and 3, illustrate that a gas entering through the opening 18 after being initially mixed with a scrubbing liquid entering through the nozzles 20, must follow a tortuous path through the maze presented by the two rows of triangular-shaped bars 30 and 32.

More specifically, it is seen in FIGURE 3 that a contaminated gas along with particles of a scrubbing fluid must first pass through the wedge-shaped slots formed by the top row of bars 30, and then complete two approximately right angle turns before passing through the corresponding expanding slots in the bottom row 32. It is also seen in FIGURES 1 and 3 that the triangular bars 28 maintained in top row 30 are positioned with their bases substantially perpendicular to a flow of gas in the chamber and with their apexes pointed upward into the direction of flow. The bottom row of triangular-shaped bars 32 is positioned with the bases of the bars 28 thereof facing the direction of the gas stream. It has been found that the gradually constricted passage presented by the triangular-shaped bars in the top row 30 causes air, incoming gas, and scrubbing liquid flows to uniformly and smoothly increase in velocity between the bars 28 until they emerge in the space between the two rows designated as dimension "c" in FIGURE 3, whereupon the gas and liquid flows impinge against the bases of the triangular-shaped bars of row 32. It is found that this impingement of the contaminated gas and scrubbing liquid against the bases of the triangular-shaped bars 28 of lower row 32 causes a high degree of mixing, i.e. scrubbing action. After impingement, the gas flows in area "c" to an opening or slot in the lower row of bars 32. Here the gas meets "head on" with gas coming in the opposite direction from other impingement surfaces causing a limited amount of turbulence which further enhances the scrubbing action. This turbulence is illustrated by the flow lines 42 and turbulence arrows 44 in FIGURE 3.

To exit from the space "c" between the two rows of bars 30 and 32, the gas must make a right angle turn and enter the expanding slot presented by the lower row of bars 32. It is found this uniformly expanding slot permits smooth expansion of the gas with a minimum of turbulence. It is also found the solids entrained scrubbing fluid uniformly runs to the lower apex of the bars in lower row 32 to drain to the bottom of the apparatus. It is found that by utilizing an impingement plate consisting of bars having triangular cross sections such as illustrated herein, a high degree of mixing of the scrubbing gas with the scrubber liquid occurs with a minimal pressure drop in the gaseous stream due to the fact the only turbulence of the gas flows is restricted to the space between bar rows 30 and 32.

For general use it has been found that the optimum cross section for bars 28 is generally a triangular cross section of isosceles shape. Broadly speaking, the dimension "b" which is the width of the bases of the triangular-shaped bars 28 shown in FIGURE 3, must be at least as great as dimension "a" which is the distance between the bases of bars 28 in each of rows 30 and 32 as shown in FIGURE 3. Dimension "c" as shown in FIGURE 3, is that dimension between the two rows of bars 30 and 32 and is generally less than dimension "b" and will vary in accordance with the type of scrubbing carried out. Dimension "d" as shown in FIGURE 3 as being the height of the isosceles triangular-shaped bars 28, is generally from about 0.875 to about 1.75 times the dimension "b".

While the cross sectional shape of bars 28 has generally been described as isosceles, it should be understood that an equilateral cross section or almost any triangular cross section slightly more acute than that of a right angle section could serve in the practice of the present invention. However, the symmetrical cross section presented by an isosceles triangular shape has generally been found most effective.

Referring again to FIGURE 1, it is seen that the space generally 50 within the scrubber body 14 located below the impingement plate assembly 26 serves as a preliminary gas-liquid separating chamber and also as a sump generally 52 for the collection and removal of the majority of the spent scrubbing liquid. The bottom of sump 52 opens into a drain 54 which is provided with a trap means 56 which serves to maintain a suitable pressure seal between the scrubbing apparatus and the outside atmosphere. Located above the sump 52 is an opening 60 through which the scrubbed gas may escape from the apparatus. As shown in FIGURE 1, the gas is conducted from the scrubber portion of the overall system generally 10 into the separating portion 12 which in this instance comprises the conventional cyclone separator.

As seen in FIGURE 1, the gas flows through the opening 60 and is conducted by means of a conduit 62 into the cyclone separator 12. The function of the cyclone separator 12 is to separate the scrubbing liquid entrained in the scrubbed gas which does not separate due to gravity in the primary separating chamber 50. It is seen the scrubbed gas enters the cyclone separator 12 through an opening 64 and descends in a spiral path down the interior of cyclone body generally 66 wherein the entrained scrubbing liquid is centrifugally separated. The separated fluid is collected at the bottom of the body 66 by means of a drain and trap generally 68. The gas passes upwardly through the separator 12 and exits through a conduit 70 which extends partway in the interior of the cyclone body 66.

It is to be understood that the cyclone separator illustrated in FIGURE 1 is of conventional design and does not form a necessary part of the present invention. Where scrubbed gas may be used without complete separation of scrubbing liquid, the cyclone separator may be dispensed with. Or if preferred, liquid separators other than the cyclone type may be used in conjunction with the novel scrubbing apparatus. It is also seen that the gas-liquid separating chamber 50 of scrubber body 14 could be extended or adapted to provide a varying amount of gravity gas-liquid separation.

Obviously many modifications and variations of the invention as hereinbefore set forth may be made without departing from the spirit and scope thereof, and therefore only such limitations should be imposed as are indicated in the appended claims.

I claim:

1. A gas scrubbing apparatus comprising: a scrubber body having a gas inlet and outlet; a single impingement gridwork within said body positioned between said inlet and outlet, said gridwork comprising a first and second row of spaced and parallel bar members having triangular-shaped cross sections, the first row being positioned in said body with apexes of the triangular bars thereof pointed substantially toward said inlet, the second row being positioned parallel to said first row and spaced therefrom a distance less than the dimension of the bases of the triangular bars of the first row with the bases of the triangular bars of said second row facing said inlet and positioned directly in line with the spaces appearing between the bars of the first row, and the dimension of the bases of said second row of bars being at least as great as the dimension of said spaces between said first row of bars; means for discharging scrubbing liquid towards said gridwork; and means for collecting and removing spent scrubbing liquid from said body.

2. The apparatus of claim 1 wherein the cross sections of said bars are of isosceles triangular shape.

3. The apparatus of claim 1 wherein the cross sections of said bars are of equilateral triangular shape.

4. The apparatus of claim 2 wherein the height of the triangular bars is from about 0.875 to about 1.75 times the width of the bases of the triangular bars.

References Cited in the file of this patent

FOREIGN PATENTS

| | | |
|---|---|---|
| 489,452 | France | Oct. 1, 1918 |
| 516,997 | France | Dec. 11, 1920 |
| 579,764 | Canada | July 21, 1959 |
| 899,196 | France | July 31, 1944 |